(12) United States Patent
Katiyar et al.

(10) Patent No.: US 9,811,259 B2
(45) Date of Patent: Nov. 7, 2017

(54) READ I/O COMPLETIONS OUTSIDE FILE OPERATING SYSTEM DOMAIN

(71) Applicant: NetApp, Inc., Sunnyvale, CA (US)

(72) Inventors: Manish Katiyar, Santa Clara, CA (US); Ananthan Subramanian, San Ramon, CA (US); Ravikanth Dronamraju, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/953,144

(22) Filed: Nov. 27, 2015

(65) Prior Publication Data

US 2017/0153816 A1 Jun. 1, 2017

(51) Int. Cl.
G06F 3/06 (2006.01)

(52) U.S. Cl.
CPC ............ *G06F 3/0604* (2013.01); *G06F 3/064* (2013.01); *G06F 3/0643* (2013.01); *G06F 3/0689* (2013.01)

(58) Field of Classification Search
CPC ..... G06F 3/0611; G06F 3/0635; G06F 3/0689
See application file for complete search history.

(56) References Cited

U.S. PATENT DOCUMENTS

| | | | | |
|---|---|---|---|---|
| 2007/0276878 | A1* | 11/2007 | Zheng | G06F 11/1435 |
| 2008/0256183 | A1* | 10/2008 | Flynn | G06F 1/183 |
| | | | | 709/204 |

\* cited by examiner

*Primary Examiner* — Edward Dudek, Jr.
(74) *Attorney, Agent, or Firm* — Nixon Peabody LLP

(57) ABSTRACT

Conventional storage filers utilize a data reading process that requires client read request messages to be suspended in the operating system while the data is retrieved from the physical storage system. Then, once the operating system retrieves the data from the physical storage system, the operating system must restart the suspended read message in order to forward the retrieved data to the client. Accordingly, the inventors have developed a system and method that allows the physical storage system's server to send the data directly to the client rather than routing back through the operating system.

14 Claims, 5 Drawing Sheets

READ I/O COMPLETIONS OUTSIDE FILE OPERATING SYSTEM DOMAIN

FIELD

The present disclosure relates generally to read input output completions.

BACKGROUND

Read Input/Output

Data storage systems manage massive amounts of data. Storage resources of the data storage system store the data, and a server coupled to the storage resources processes access requests (e.g., read and/or write requests) to the data. Data storage systems typically serve data access requests for many clients, including human users, remote computing systems, internal applications, or other sources of access requests. An operating system including a filesystem processes and services the access requests and provides access to the data. Data storage systems typically implement some form of caching to improve efficiency and throughput in the system. The operating system and its file system guarantee the validity of the data.

As described herein, a server of a storage system includes a data access manager that accesses data with a physical location identifier instead of a logical block reference identifier. The server includes an operating system with a filesystem that manages data access, including caching the data, and referencing and serving the data from cache. The filesystem uses the logical block reference identifier to manage access to the cached data via one or more levels of indirection. The logical block reference identifier can alternatively be referred to as an indirection identifier, and represents the data indirectly; the logical block reference identifier must be mapped to a physical location identifier to access the data. The data access manager can obtain a physical location identifier (e.g., by obtaining and resolving an indirection identifier) that directly references a physical memory location of the data.

The filesystem maintains a pool of buffers, including management of availability of the buffers (e.g., allocation and deallocation of resources for the buffers). The pool of buffers is a group of logical data units of memory used to cache data. The buffers can be managed or maintained through an index or hash created to identify the logical data unit. It will be understood that a buffer is a representation of a physical resources (e.g., storage or memory resources), such as a location in a cache device. The cache can be represented logically as a "hash" representation, which allows logical operations on data access requests prior to committing the requests to the physical resources. From the perspective of locating data and performing checks on the data, typically such operations are performed by an access layer as logical operations on the hash or logical representation of the data. Ultimately, the data is stored in, and accessed from, physical locations.

The buffers can be provisioned by initializing the buffer and generating an identifier or hash value for the buffer and allocating resources to manage the buffer. The filesystem typically provisions buffers for use in a buffer cache, which is a caching device that buffers data access requests between the operating system and disk storage. As described herein, the data access manager can provision buffers to a cache location separate from the buffer cache. The separate cache location can be a cache location that is logically separated from the buffer cache in that the same physical device can store the data, and the data access manager provisions and maintains it. Thus, the memory resources are not available for the filesystem to provision for the buffer cache. In some cases, the data access manager can be considered independent or separate from the filesystem in that the data access manager can execute in parallel to the filesystem, and can access data in parallel to the filesystem without going through the filesystem to access the data.

The data access manager can be considered to bypass the filesystem by performing data access that is not managed by the filesystem and not part of the buffer cache managed by the filesystem. The buffer cache is a caching mechanism used by the filesystem to manage data access. When the data access manager bypasses the filesystem and the buffer cache, the data accessed does not have the guarantees of validity that are provided by the management of the filesystem. Thus, the data access manager provides validity checking of data obtained with a physical location identifier instead of a logical block reference identifier. If the validity check fails, the data access manager discards the data from its cache, which can be referred to as a private cache, in contrast to the buffer cache managed by the filesystem. When the validity test passes, the data access manager can provide access to the data by the requesting program.

The requesting program is an application or process, whether a system-level or user-level program, which makes a request for data. The expression "requesting program" or "requesting application" can refer to any standalone software application, as well as threads, processes, or subroutines of a standalone software application. The requesting program will frequently be a service or management entity within the storage system, and interfaces with the data and the operating system of the storage system on behalf of clients of the storage system. The clients can refer to remote programs or devices that are separate from the storage system and access the storage system over a network.

Operationally, a request from a client is forwarded as a packet over the network and onto the storage server where it is received at a network adapter. A network driver processes the packet and, if appropriate, passes it on to a network protocol and file access layer for additional processing prior to forwarding to file system. There, file system generates operations to load (retrieve) the requested data from the disks if it is not resident in the buffer cache. If the information is not in memory, file system accesses the inode file to retrieve a logical vbn and passes a message structure including the logical vbn to the RAID system. There, the logical vbn is mapped to a disk identifier and device block number (disk, dbn) and sent to an appropriate driver of disk driver system 890. The disk driver accesses the dbn from the specified disk and loads the requested data block(s) in memory for processing by the storage server. Upon completion of the request, the node (and operating system 800) returns a reply to the client over the network.

Background on Example Devices for Testing—Storage Filers

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Storage Operating System

As used herein, the term "storage operating system" generally refers to the computer-executable code operable on a computer that manages data access and may, in the case of a filer, implement file system semantics, such as a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Physical Disk Storage

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL™ file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

BRIEF DESCRIPTION OF THE DRAWINGS

The accompanying drawings, which are incorporated in and constitute a part of this specification, exemplify the embodiments of the present disclosure and, together with the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
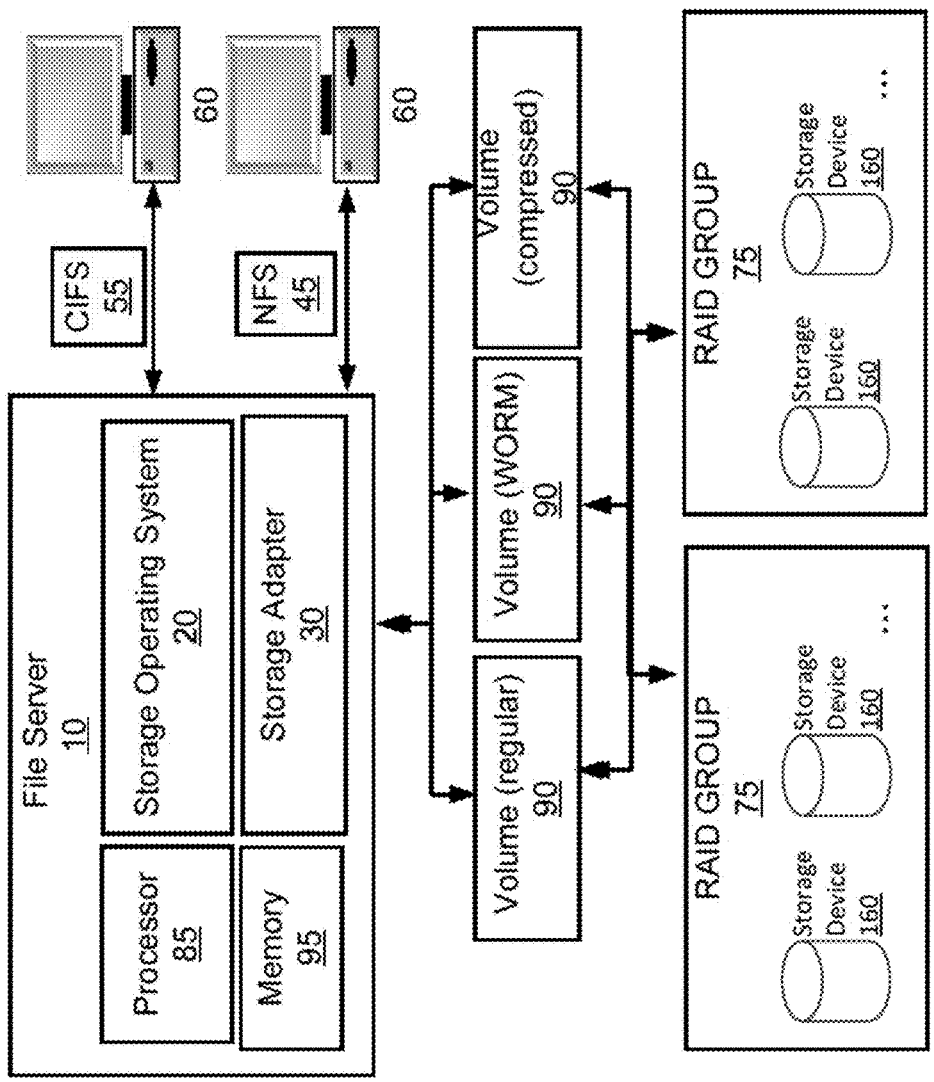
FIG. 1 depicts, in accordance with various embodiments of the present disclosure, a diagram representing a storage system.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this disclosure belongs. One skilled in the art will recognize many methods and materials similar or equivalent to those described herein, which could be used in the practice of the present disclosure. Indeed, the present disclosure is in no way limited to the methods and materials specifically described.

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

Overview

Conventional storage filers utilize a data reading I/O process that requires client read messages to be suspended in the operating system while the data is retrieved from the physical storage system (e.g. RAID). Then, once the operating system retrieves the data from the physical storage system, the operating system must restart the suspended read message in order to forward the retrieved data to the client.

Accordingly, the inventors have developed a system and method that allows the physical storage system to send the data directly to the client rather than routing back through the operating system. Accordingly, when a read message is received form a client, the operating system forwards its contents with a RAID read message, so the RAID system (or other physical storage system) can send the data directly to the client. Thus, this increases the efficiency of the entire system because it does not require additional processing by the operating system after the data is retrieved.

Example Storage System

FIG. 1 illustrates an overview of an example of a storage system according to the present disclosure. The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In some embodiments, the storage system includes a file server 10 that administers a storage system. The file server 10 generally includes a storage adapter 30 and a storage operating system 20. The storage operating system 20 may be any suitable storage system to access and store data on a RAID or similar storage configuration such as the Data ONTAP™ operating system available from NetApp, Inc.

The storage adaptor 30 is interfaced with one or more RAID groups 75 or other mass storage hardware components. The RAID groups include storage devices 160. Examples of storage devices 160 include hard disk drives, non-volatile memories (e.g., flash memories), and tape drives. The storage adaptor 30 accesses data requested by clients 60 based at least partially on instructions from the operating system 20.

Each client 60 may interact with the file server 10 in accordance with a client/server model of information delivery. That is, clients 60 may request the services of the file server 10, and the file server 10 may return the results of the services requested by clients 60 by exchanging packets encapsulating, for example, Transmission Control Protocol (TCP)/Internet Protocol (IP) or another network protocol (e.g., Common Internet File System (CIFS) 55 and Network Files System (NFS) 45 format.

The storage operating system 20 implements a file system to logically organize data as a hierarchical structure of directories and files. The files (e.g. volumes 90) or other data batches may, in some embodiments, be grouped together and either grouped in the same location or distributed in different physical locations on the physical storage devices 160. In some embodiments, the volumes 90 will be regular volumes, dedicated WORM volumes 90, or compressed volumes 90.

Conventional Systems and Methods for Processing Read Requests

Figure 2:
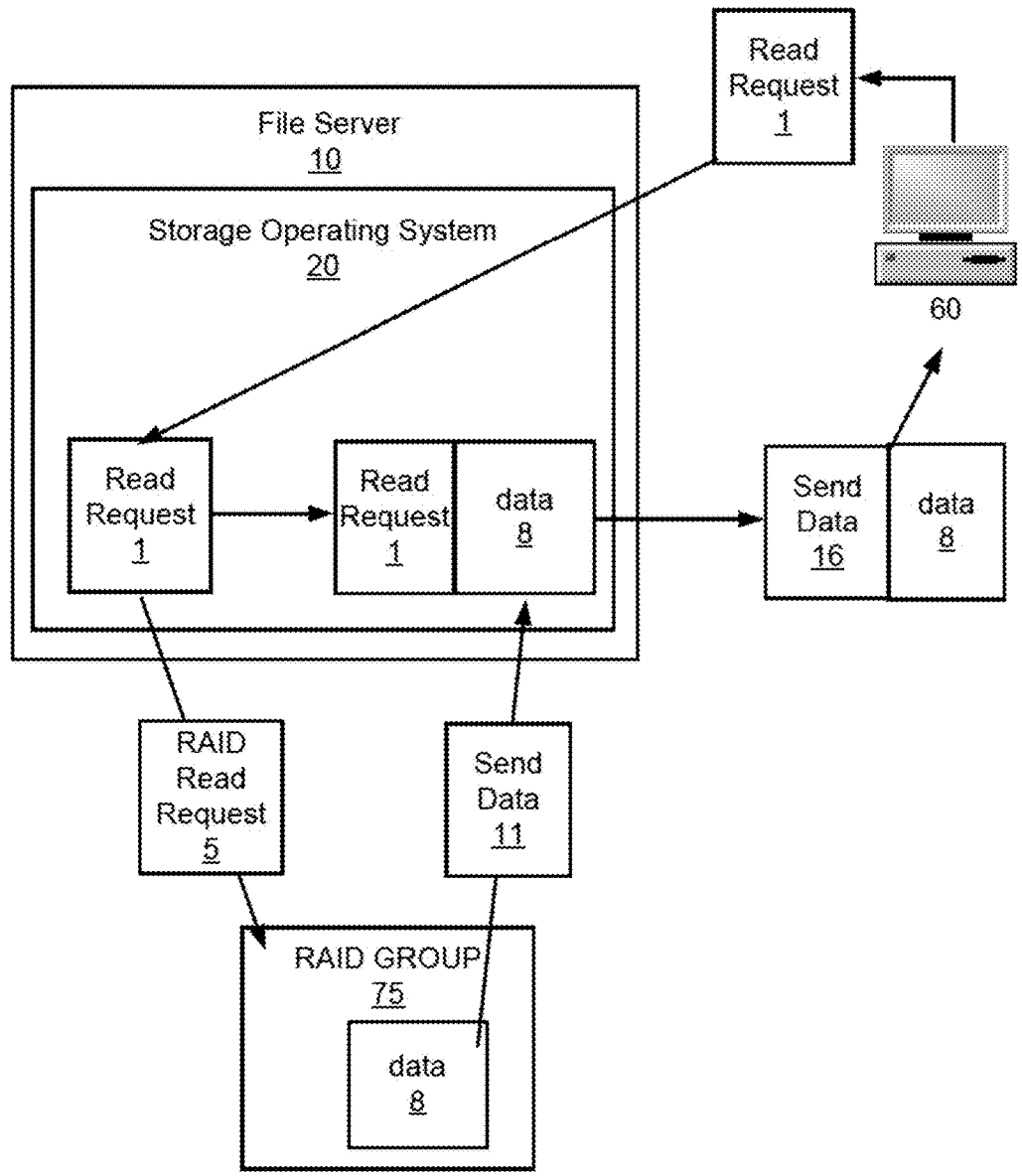
FIG. 2 depicts, in accordance with various embodiments of the present disclosure, a high level functional block diagram of prior art systems and methods for processing read requests.

FIG. 2 is a high level flow chart illustrating a conventional process for reading data. Conventional storage filers 10 utilize a data reading process that requires client read request 1 messages to be suspended in the operating system 1 while the data is retrieved 5 from the physical storage system (e.g. RAID) 75. Once the physical storage system 75 reads the data 8 from physical storage 160, then the physical storage system 75 sends 11 the data 8 back to the operating system 20. Then, once the operating system 20 retrieves the data 8 from the physical storage system 75, the operating system 20 must restart the suspended read message 1 in order to forward the retrieved data 8 to the client 16.

Figure 3:
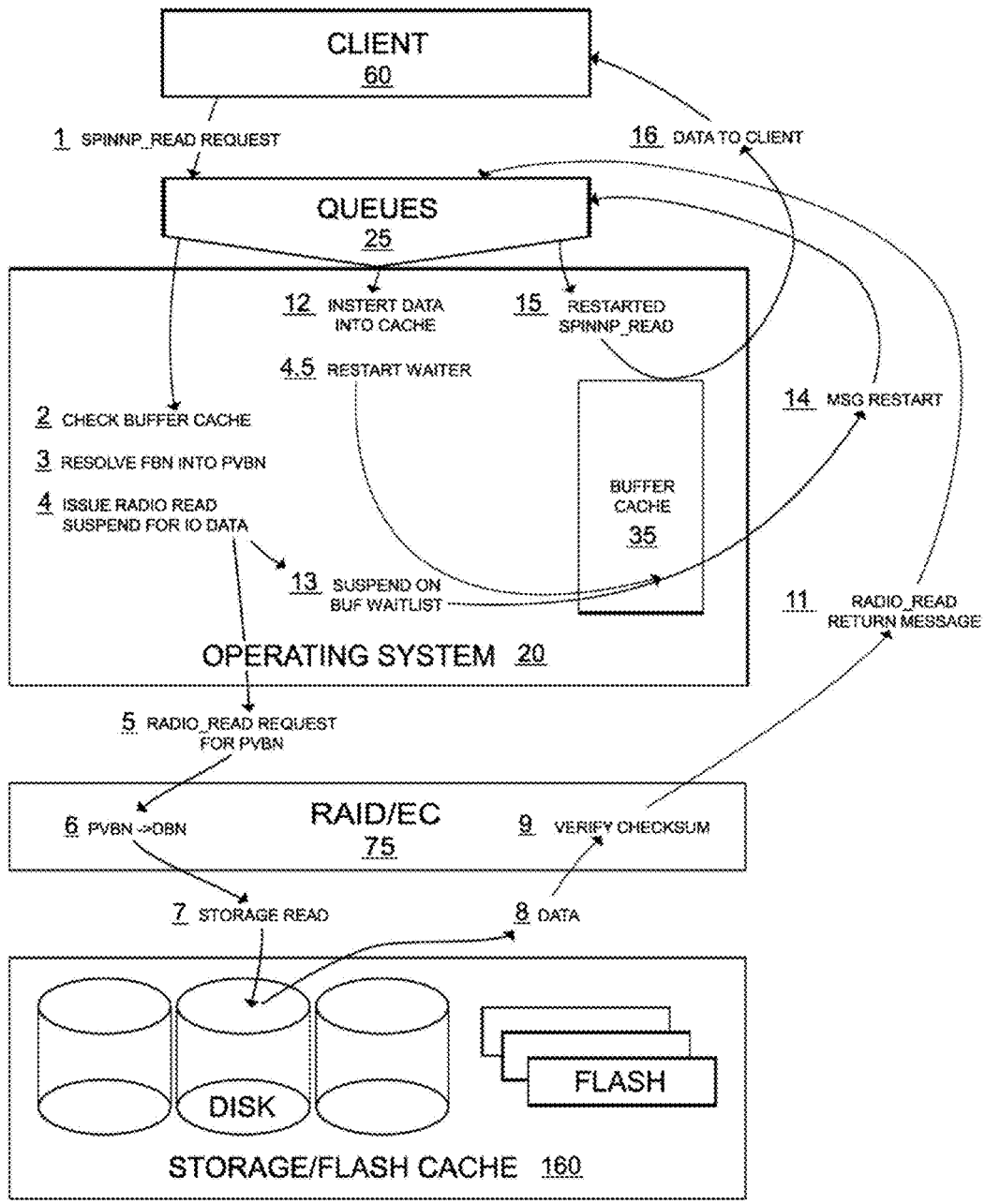
FIG. 3 depicts, in accordance with various embodiments of the present disclosure, a detailed functional block diagram of prior art systems and methods for processing client read requests.

FIG. 3 is a flow chart illustrating a detailed conventional example of a diagram illustrating an example of a conventional system for servicing read requests from a client 60. For example, the client 60 may issue a read request 1 that is directed to the operating system 20 and may be entered into the operating system queues 25 for processing.

Initial processing by the operating system 20 includes checking 2 the buffer cache 35 for the data 8 to determine if the requested data 8 is already present in the operating system 20 buffer memory 35. If the data 8 is present, the operating system 20 would respond with the requested data 8. However, if the data 8 is not present in the buffer cache 35, the operating system 20 can then send a request to the RAID 75 or other mass storage device server to read the data 8 from the physical storage device 160.

Accordingly, the FBN provided by the message 1 must be resolved into a physical volume block number (PVBN) 3 by the operating system 20. In some cases, this will be first performed by resolving the FBN into a virtual volume block number (VVBN) that is then resolved into a PVBN 3. Once that is performed, the original read request 1 from the client 60 is suspended on a buffer waitlist 13 or other waitlist, to allow the data 8 to be retrieved from RAID or other physical storage system 75.

Accordingly, after suspension of the original read message 13, the operating system 20 then issues a read request 5 with the PVBN to the physical storage system 75 (e.g. RAID). The physical storage system 75 can resolve 6 the PVBN into a database number (DBN). Then physical storage system 75 can read 7 the requested data 8 from the physical storage 160. Then, once read 8 into the memory of the physical storage system 75, it can verify the checksum 10 of the data.

Then once the read data is verified, the physical storage system 75 sends a message 11 back to the operating system 20 with the requested data 8 to return into the queue 25 for processing. Once the operating system 20 processes the message 11, it inserts the data 8 into the buffer cache 12. Accordingly, now that the data 8 is in the buffer cache 35, the original read request 1 that the operating system 20 suspended on the waitlist can be restarted 14.

Once the message is restarted 14, it is sent back to the operating system queue 25, and then processed. Once it is processed again, it can then read the data 15 from the buffer cache 35, because the data is now in the buffer cache 35. Since the original read message 1 has been restarted with the original client location, the operating system 20 can send the data to the client 16, and does not need to further suspend the message to read the data from RAID 75, because the data is now in the buffer cache 35.

The above process is the convention process for reading data based on conventional storage systems. As shown, it requires the operating system 20 to process the read message 1 twice through the operating system 20 queue 25. This adds considerable latencies to reads requests 1, because the data 8 is not return until the read request message 1 is processed twice by the operating system 20. It also requires additional resources to maintain the read message waitlist, to additionally process the message again, and for assembling and sending the message to the client 60.

Bypassing OS Stack on Read Completion

Figure 4:
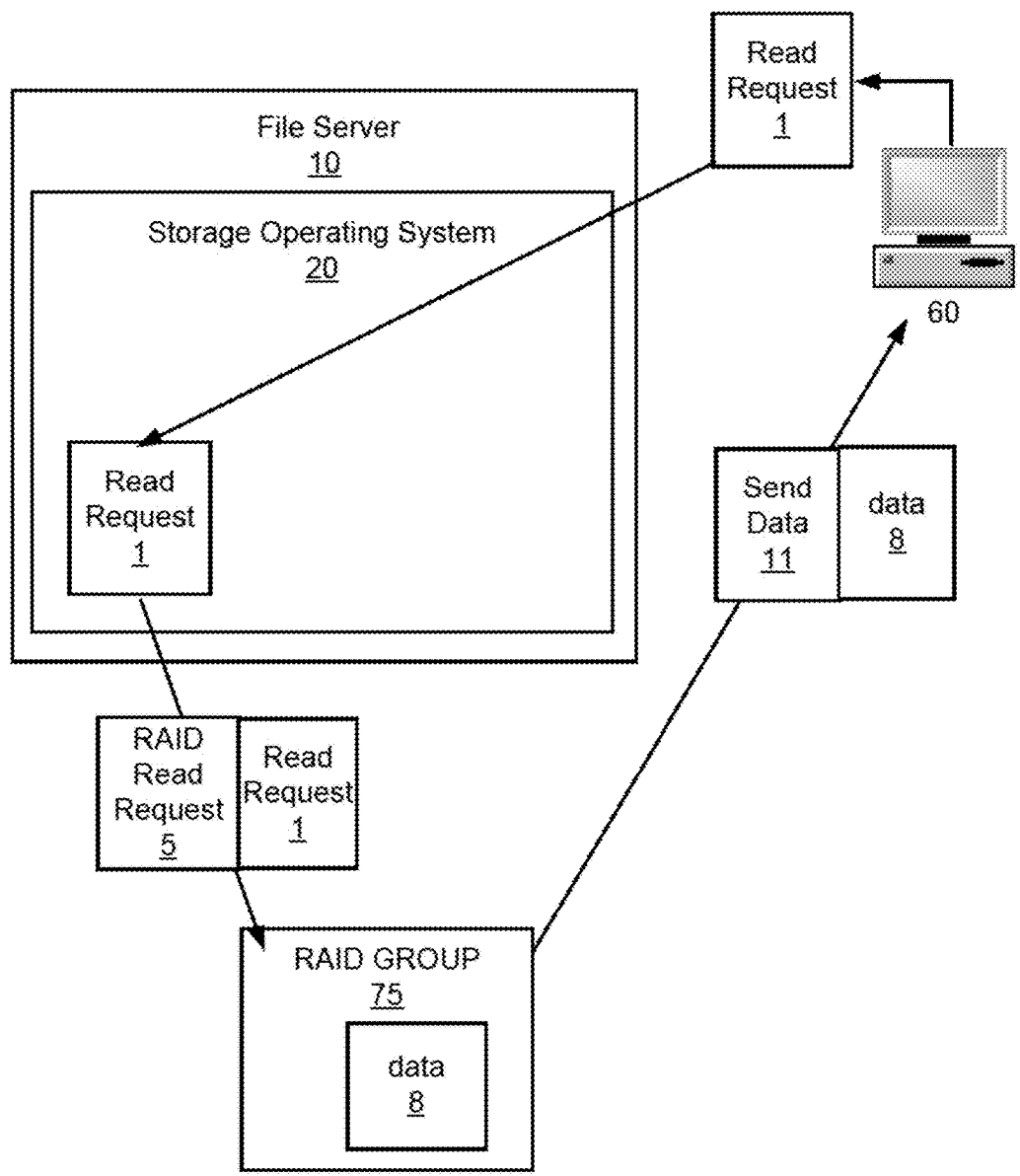
FIG. 4 depicts, in accordance with various embodiments of the present disclosure, a high level functional block diagram of prior art systems and methods for processing read requests that bypass the OS stack upon read completion.

Accordingly, as illustrated in the high level flow chart of FIG. 4, the inventors have developed new systems and methods to bypass the operating system 20 domain upon completing the read request 1. Particularly, in some embodiments, instead of suspending 13 the read request 1 from the client 60 in the operating system 20, the physical storage 75 system itself can send the data 11 directly to the client 60. In this embodiment, the information from the initial read request 1 from the client 60 will be included in the read request 5 from the operating system 20 to the physical storage system 75, including the client 60 location information. This will allow RAID 75 (or other physical storage system) to directly send the read data 8 from the disk 160 to the client 60, after standard verification procedures are performed, including data integrity checks.

Accordingly, the RAID bypasses the operating system for the step of sending the data to the client 60, and sends it directly to the client 60. This is instead of the convention method of a restarting a suspended client 60 read message 1, or otherwise requiring the operating system 20 to process the data 8 and send it to the client 60. Accordingly, if the operating system 20 must first process the data 8 output from the physical storage system 75 before sending the data 8 to the client 60, it will introduce inefficiencies in the system. Accordingly, the disclosed systems and methods remove that step.

Figure 5:
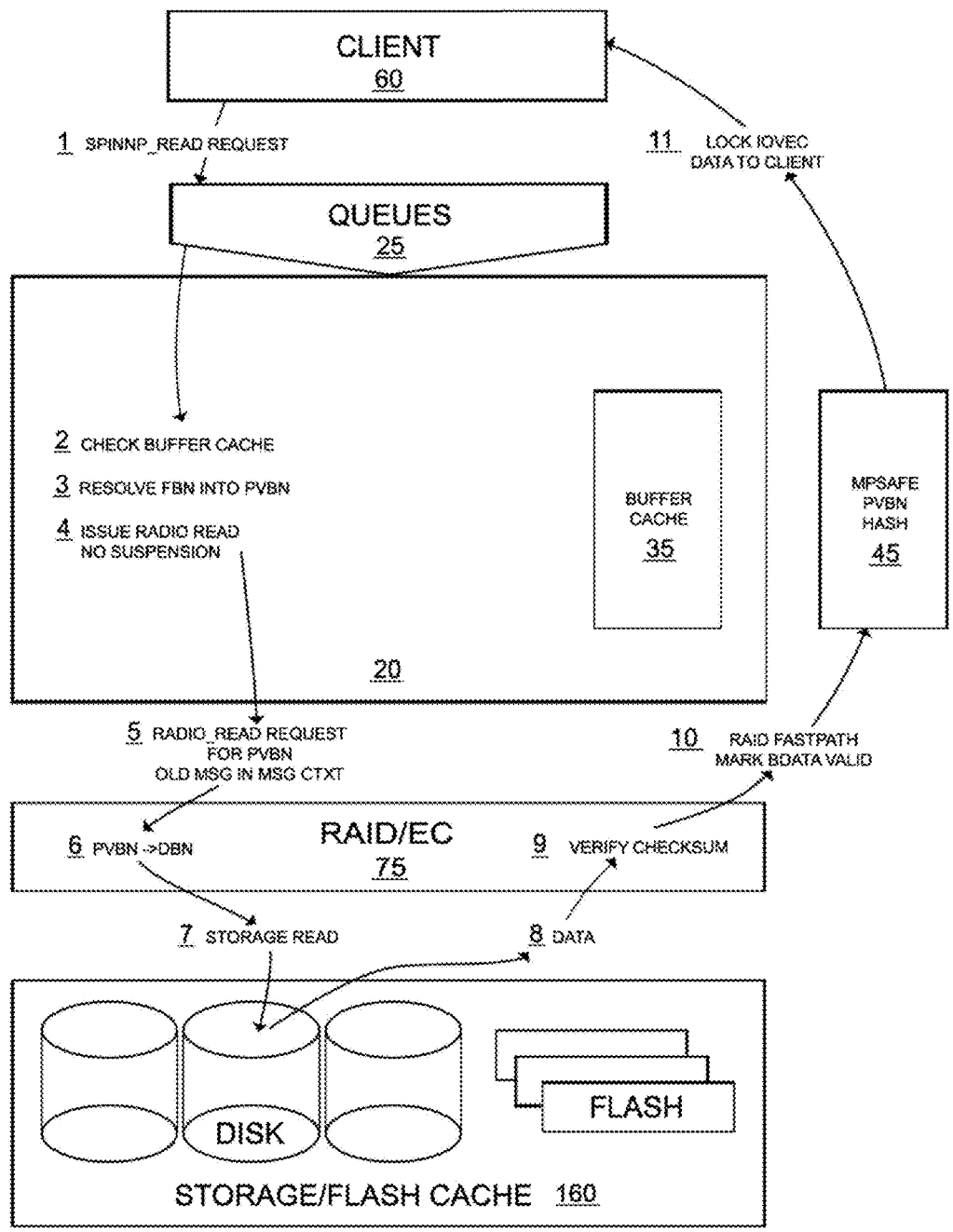
FIG. 5 depicts, in accordance with various embodiments of the present disclosure, a detailed functional block diagram of systems and methods for processing client read requests that bypass the OS stack upon read completion.

FIG. 5 illustrates a detailed flow chart showing an example of the disclosed systems and methods that bypass the operating system 20 on read completion. For instance, once the client request 1 is send to the operating system 20, the operating system 20 still first resolve the physical location of the requested data on disk 160. For instance, the operating system 20 may check the buffer cache 2 for the data, and if it is not present, it may resolve the FBN or other pointer into a physical location (e.g. PVBN). Then, message and/or its contents will be forwarded to issue a read request 4 to RAID 75 (or other physical storage system), without suspending the message. The contents of the initial read request 1 will be copied into the RAID read request 5 that is sent to RAID 75.

Then RAID 75 can resolve the PVBN to a DBN 6, read the stored data 7, and then retrieve the data 8 back to the RAID 75 system. Then, the RAID 75 system may verify the checksum 9. However, instead of sending the read data 8 with a message to the operating system 20 queue 25, the data 7 is sent to the client after passing through the MPSafe 45 or other data integrity check processes. In some embodiments, the RAID 75 system may perform the MPSafe 45 check. In other embodiments, a portion of the operating system 20 may perform the MPSafe 45 or other data integrity verification without requiring waking up the original message 1.

In this embodiment, the read data 8 will be sent from RAID 75 along with the location information of the requesting client 60 so that it may be forwarded directly to the client 60. Therefore, unlike the convention system, the data set 8 from the RAID 75 does not need to be associated with a suspended message in the operating system 20 that contains the location information of the client 60 and other necessary details of the read request. Therefore, this provides a large increase in efficiency as the extra steps are bypassed, and in some embodiments, the operating system 20 domain may be completely or partially bypassed.

CONCLUSIONS

It will be understood to those skilled in the art that the techniques described herein may apply to any type of special-purpose computer (e.g., file serving appliance) or general-purpose computer, including a standalone computer, embodied as a storage system. To that end, the filer can be broadly, and alternatively, referred to as a storage system.

The teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present disclosure, but merely be understood to illustrate one example implementation thereof.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method for reading data from within a storage system that bypasses a storage operating system upon read completion, the method comprising:
   receiving, from a client device, a client read request for a data set at the storage operating system executed by a server;
   processing the client read request, by the storage operating system, to resolve a file block number (FBN) contained in the read request into a physical volume block number (PVBN) identifying the physical location of the data set in a RAID storage system without suspending the client read request in the storage operating system;
   sending, by the storage operating system, a RAID read request for the data set at the PVBN to the RAID storage system, the RAID read request including the content of the client read request;
   reading by the RAID storage system, the data set from physical storage devices contained within the RAID system; and
   sending, by the RAID system, the data set to the client, to bypass the storage operating system.

2. The method of claim 1, wherein the step of sending, by the RAID system, the data set to the client further comprises first verifying the integrity of the data.

3. The method of claim 2, wherein the step of verifying the integrity of the data is performed by the server outside the domain of the storage operating system.

4. The method of claim 2, wherein the step of verifying the integrity of the data is performed by the RAID system.

5. The method of claim 1, wherein the storage operating system appends the entire client read request to the RAID read request.

6. A non-transitory machine readable medium having stored thereon instructions for performing a method for executing a test of a storage filer comprising machine executable code which when executed by at least one machine, causes the machine to:
   receive, from a client device, a client read request for a data set at a storage operating system executed by a server;
   process the client read request, by the storage operating system, to resolve a file block number contained in the client read request to a physical location identifier for the data set in a RAID system without suspending the client read request in the storage operating system; and
   send, by the storage operating system, a RAID read request for the data set with the physical location identifier to the RAID system, the RAID read request including the content of the client read request and instructions for the RAID system to send the data to the client to bypass the storage operating system.

7. The non-transitory machine readable medium of claim 6, wherein the content of the read request comprises the location of the client device.

8. The non-transitory machine readable medium of claim 6, wherein the storage operating system copies the content of the client read request into the RAID read request and discards the client read request from the storage operating system.

9. The non-transitory machine readable medium of claim 6, wherein the storage operating system appends the client read request to the RAID read request and discards the client read request from a storage operating system waitlist queue.

10. A computing device comprising:

a memory containing machine readable medium comprising machine executable code having stored thereon instructions for performing a method of executing a test of a storage filer;

a control system comprising a processor or processors coupled to the memory, the control system configured to execute the machine executable code to cause the control system to:

receive, by a RAID system, a RAID read request to send a data set to a location of a client, the request received from a storage operating system executed by a server, the RAID read request including a physical volume block number (PVBN) of the data and the content of a client read request appended to the RAID read request by the storage operating system;

process, by the RAID system, the RAID read request to resolve the PVBN into a location on a physical storage device and read the data set from the physical storage device; and send, by the RAID system, the data set to the location of the client to bypass the storage operating system.

11. The computing device of claim 10, wherein the machine executable code further causes the control system to, verify, by the RAID system, the integrity of the read data prior to sending to the client.

12. The computing device of claim 10, wherein the machine executable code further causes the control system to resolve, by the physical data storage system, the read request to a database number (DBN) value.

13. The computing device of claim 10, wherein RAID system sends the data set directly to the client.

14. The computing device of claim 10, wherein the RAID system sends the data set to the server outside of a domain of the storage operating system.

* * * * *